United States Patent
Lopez (10) Patent No.: US 12,490,789 B1
(45) Date of Patent: Dec. 9, 2025

(54) MULTIPURPOSE DENTAL GLOVE

(71) Applicant: Benjamin Lopez, Sacramento, CA (US)

(72) Inventor: Benjamin Lopez, Sacramento, CA (US)

( * ) Notice: Subject to any disclaimer, the term of this patent is extended or adjusted under 35 U.S.C. 154(b) by 0 days.

(21) Appl. No.: 18/892,363

(22) Filed: Sep. 21, 2024

(51) Int. Cl.
*A41D 19/00* (2006.01)
*A01K 13/00* (2006.01)

(52) U.S. Cl.
CPC ........ *A41D 19/0024* (2013.01); *A01K 13/001* (2013.01)

(58) Field of Classification Search
CPC ........................ A41D 19/0024; A01K 13/001
See application file for complete search history.

(56) References Cited

U.S. PATENT DOCUMENTS

| | | | | |
|---|---|---|---|---|
| 1,161,719 A | * | 11/1915 | Norton | A61H 7/003 401/266 |
| 1,261,706 A | * | 4/1918 | Condley et al. | A61F 13/105 2/21 |
| 2,075,413 A | * | 3/1937 | Logue | A46B 5/04 401/266 |
| 2,092,987 A | * | 9/1937 | Remington | A46B 5/04 2/21 |
| 2,285,981 A | * | 6/1942 | Johns | A61F 13/105 2/21 |
| 2,288,840 A | * | 7/1942 | Raiche | B29C 41/14 450/97 |
| 2,379,624 A | * | 7/1945 | Chisnell | A61F 13/105 2/21 |
| 2,966,691 A | * | 1/1961 | Cameron | A46B 5/04 2/21 |
| 3,233,369 A | * | 2/1966 | Highberg | B24B 55/02 451/260 |
| 3,562,385 A | * | 2/1971 | Block et al. | A61K 8/43 424/57 |
| 4,001,393 A | * | 1/1977 | L'Orange | A61Q 11/00 424/54 |
| 4,093,711 A | * | 6/1978 | Blackburne | A61K 8/40 424/49 |
| 4,600,389 A | * | 7/1986 | Schwartz | A61K 6/853 106/35 |
| D313,317 S | * | 1/1991 | Brunner | D4/103 |
| 5,112,880 A | * | 5/1992 | Tsunekawa | A61K 6/77 522/81 |

(Continued)

FOREIGN PATENT DOCUMENTS

WO 2018042344 A1 3/2018

*Primary Examiner* — Robert H Muromoto, Jr.
(74) *Attorney, Agent, or Firm* — Gugliotta & Gugliotta LPA (57) ABSTRACT

A multipurpose dental glove for comprehensive oral care is provided. The glove includes a glove body with multiple finger sheaths, each having a textured fingertip designed for a specific oral care function. The textured fingertips may include polishing tips, scrubbing tips, and a massaging brush, each made from materials suited to their function. The polishing and scrubbing tips comprise synthetic fibers coated with microscopic diamond particles of varying sizes to achieve different levels of abrasiveness. The massaging brush comprises nylon bristles for gum stimulation. This design allows for a thorough, customizable oral care routine using a single device, potentially improving efficiency and effectiveness of daily dental hygiene practices for adults, children, and animals.

12 Claims, 5 Drawing Sheets

(56) References Cited

U.S. PATENT DOCUMENTS

| | | | |
|---|---|---|---|
| 5,444,113 A * | 8/1995 | Sinclair | D21H 17/53 523/124 |
| D363,606 S | 10/1995 | Abrahamson | |
| 5,549,924 A * | 8/1996 | Shlenker | A61F 6/04 427/407.1 |
| 5,765,252 A * | 6/1998 | Carr | A46B 5/04 15/104.94 |
| 6,361,316 B1 * | 3/2002 | Matsutani | A61C 1/082 433/108 |
| D485,072 S * | 1/2004 | Brown-Paschal | D4/103 |
| 7,020,898 B1 | 4/2006 | Pucci et al. | |
| D816,941 S * | 5/2018 | Michaelson | B29C 45/1701 D30/158 |
| 10,349,734 B2 * | 7/2019 | Xavier | A41D 13/08 |
| 10,758,490 B2 * | 9/2020 | Viladot Petit | B01J 13/10 |
| 11,065,733 B2 * | 7/2021 | Thysell | B24B 7/186 |
| 11,103,053 B2 * | 8/2021 | Toofer | A46B 5/04 |
| 11,432,990 B2 * | 9/2022 | Christoforou | A61M 35/10 |
| 11,659,921 B2 * | 5/2023 | Toofer | A46B 5/04 15/167.1 |
| D1,032,209 S * | 6/2024 | Toofer | A46B 5/04 D30/158 |
| 12,150,429 B2 * | 11/2024 | Michaelson | A01K 13/001 |
| 2002/0183229 A1 * | 12/2002 | Simpson | A01N 61/00 510/392 |
| 2008/0227055 A1 | 9/2008 | Seidman | |
| 2009/0156099 A1 * | 6/2009 | Copoulos | B24B 7/186 451/353 |
| 2011/0029004 A1 | 2/2011 | Papetti | |
| 2011/0247963 A1 * | 10/2011 | Stockett | G09B 23/288 206/572 |
| 2013/0017239 A1 * | 1/2013 | Viladot Petit | A61K 8/342 424/401 |
| 2013/0216596 A1 * | 8/2013 | Viladot Petit | A61K 8/64 424/463 |
| 2016/0227978 A1 | 8/2016 | Shaykova | |
| 2020/0129257 A1 | 4/2020 | Avitan | |
| 2020/0221859 A1 | 7/2020 | Scully | |
| 2021/0315290 A1 | 10/2021 | Mourey | |

* cited by examiner

MULTIPURPOSE DENTAL GLOVE

CROSS-REFERENCE TO RELATED APPLICATIONS

There are no previously filed, nor currently any co-pending applications, anywhere in the world.

BACKGROUND OF THE INVENTION

1. Field of the Invention

The present invention relates generally to dental hygiene devices and, more particularly, to a multipurpose dental glove that combines multiple oral care functions into a single, wearable device.

2. Description of the Related Art

Dental hygiene has long been recognized as a crucial aspect of overall health and well-being. Traditional oral care routines typically involve the use of multiple tools and products, each designed for specific tasks, such as toothbrushes for cleaning tooth surfaces, dental floss for cleaning between teeth, tongue scrapers for removing bacteria from the tongue, and various other specialized tools.

While these tools have been effective to varying degrees, they present several limitations and challenges in achieving optimal oral health. The use of multiple tools requires individuals to perform several separate actions to achieve a thorough clean, leading to complexity and inefficiency in oral care routines. This complexity can result in inconsistent or incomplete oral care, particularly when users are short on time or lack motivation.

Furthermore, standard tools may not effectively clean all areas of the mouth, with hard-to-reach areas like back molars, the roof of the mouth, or the inside of cheeks often being neglected. Most dental hygiene tools also offer limited options for adjusting cleaning intensity or targeting specific oral health needs, presenting a one-size-fits-all approach that may not be optimal for individuals with varying oral health conditions or sensitivities.

Additionally, reusable tools like toothbrushes can harbor bacteria if not properly cleaned and stored, potentially reintroducing harmful microorganisms into the mouth during subsequent use. The frequent replacement of toothbrushes and use of disposable items like floss also contribute to environmental concerns.

These limitations in current dental hygiene practices highlight a clear need for innovation in the field. An ideal solution would address multiple aspects of oral care in a single, easy-to-use device, providing a more efficient, thorough, and customizable approach to dental hygiene.

SUMMARY OF THE INVENTION

It is an object of the present invention to provide a comprehensive oral care solution that combines multiple dental hygiene functions in a single device.

It is another object of the present invention to offer a more efficient oral care routine by eliminating the need to switch between multiple tools.

It is a further object of the present invention to enable thorough cleaning of all areas of the mouth, including hard-to-reach spots that are often neglected by traditional tools.

It is still a further object of the present invention to provide customizable cleaning intensities through various textured fingertips, allowing users to tailor their oral care routine to their specific needs.

It is yet another object of the present invention to provide an engaging and entertaining oral care solution for children, incorporating designs that make the dental hygiene routine fun and educational.

It is a further object of the present invention to offer a versatile oral care solution that can be adapted for use on animals, providing a comprehensive cleaning tool for pet owners and veterinarians.

The present invention provides a multipurpose dental glove that addresses these objectives. In preferred embodiments, the inventive device includes: a glove incorporating multiple textured fingertips, each designed for specific oral care functions; and a variety of materials and textures on each fingertip to perform different cleaning, polishing, and massaging actions within the mouth.

The invention of the Multipurpose Dental Glove aims to address these challenges by offering a comprehensive, all-in-one solution for oral care. By combining multiple functions into a single, intuitive device, it has the potential to revolutionize daily dental hygiene routines, making thorough oral care more accessible, efficient, and effective for a wide range of users.

It is an advantage of the present invention to provide a comprehensive oral care solution that combines multiple dental hygiene functions in a single device.

It is another advantage of the present invention to offer a more efficient oral care routine by eliminating the need to switch between multiple tools.

It is an advantage of the present invention to enable thorough cleaning of all areas of the mouth, including hard-to-reach spots that are often neglected by traditional tools.

It is another advantage of the present invention to provide customizable cleaning intensities through various textured fingertips, allowing users to tailor their oral care routine to their specific needs.

It is an advantage of the present invention to promote improved gum health through a dedicated massaging brush feature.

It is another advantage of the present invention to offer an intuitive and easy-to-use design that may benefit individuals with limited dexterity or motor skills.

It is an advantage of the present invention to potentially reduce bacterial growth and cross-contamination risks associated with traditional toothbrushes through its washable or disposable design.

It is another advantage of the present invention to provide a more environmentally friendly option for oral care by reducing the need for multiple disposable products.

It is an advantage of the present invention to offer a portable and travel-friendly oral care solution that replaces multiple tools with a single device.

It is another advantage of the present invention to potentially bridge the gap between professional dental cleanings by offering a more thorough at-home cleaning option.

It is an advantage of the present invention to provide a solution for gentle yet effective cleaning of sensitive areas in the mouth.

It is another advantage of the present invention to offer a cost-effective oral care solution by combining multiple tools into one device.

It is an advantage of the present invention to potentially increase user compliance with recommended oral care routines by simplifying the process.

It is another advantage of the present invention to provide a scalable design that can be adapted for various hand sizes and preferences.

It is an advantage of the present invention to offer a potential tool for dental professionals to use during examinations or cleaning procedures, providing a more comfortable experience for patients.

It is another advantage of the present invention to promote a more holistic approach to oral care by addressing multiple aspects of dental hygiene simultaneously.

It is an advantage of the present invention to potentially reduce the time required for a thorough oral care routine without compromising on quality.

It is another advantage of the present invention to offer a novel solution that may encourage better oral hygiene habits through its innovative and engaging design.

Further features of the invention will become apparent in the course of the following description.

BRIEF DESCRIPTION OF DRAWINGS

The advantages and features of the present invention will become better understood with reference to the following more detailed description and claims taken in conjunction with the accompanying drawings, in which like elements are identified with like symbols, and in which:

DETAILED DESCRIPTION OF THE INVENTION

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. DETAILED DESCRIPTION OF THE FIGURES

Referring now to the drawings, wherein like reference numerals indicate the same parts throughout the several views, a dental hygiene glove (herein described as the "invention") 100. The invention 100 may comprise a glove 200 with a plurality of textured fingertips 206. The glove 200 may be adapted to be donned by a user 950 on either a left hand 910 or a right hand 920. The plurality of textured fingertips 206 may comprise at least one (1) polishing fingertip, at least one (1) scrubbing fingertip, and at least one (1) massaging brush 232. The plurality of textured fingertips 206 may be adapted to be rubbed on teeth, gums, tongue, and inside of the mouth to promote oral health. As non-limiting examples, the invention 100 may be adapted to remove food particles, massage the gums, and increase blood circulation.

The glove 200 may comprise a main body 202 that may be adapted to cover the palm and the back of a hand and a plurality of finger sheaths 204 that may be adapted to cover a plurality of fingers. The glove 200 may comprise a cuff opening 208 adapted for the hand to be inserted into the glove 200.

The plurality of finger sheaths 204 may comprise a first sheath 210 adapted to cover a thumb. The first sheath 210 may alternatively be known as a thumb sheath. The plurality of finger sheaths 204 may comprise a second sheath 220 adapted to cover an index finger. The second sheath 220 may alternatively be known as an index finger sheath. The plurality of finger sheaths 204 may comprise a third sheath 230 adapted to cover a middle finger. The third sheath 230 may alternatively be known as a middle finger sheath. The plurality of finger sheaths 204 may comprise a fourth sheath 240 adapted to cover a ring finger. The fourth sheath 240 may alternatively be known as a ring finger sheath. The plurality of finger sheaths 204 may comprise a fifth sheath 250 adapted to cover a pinky finger. The fifth sheath 250 may alternatively be known as a pinky sheath.

The plurality of textured fingertips 206 may be coupled to the distal ends of the plurality of finger sheaths 204. The plurality of textured fingertips 206 may be adapted to be rubbed inside the mouth by the user 950. The plurality of textured fingertips 206 may comprise at least one (1) scrubbing fingertip, at least one (1) polishing fingertip, and at least one (1) massaging brush 232. The scrubbing fingertip may be adapted to scrub the food particles from the teeth, the gums, the tongue and elsewhere inside the mouth. The polishing fingertip may be adapted to polish the teeth. The massaging brush 232 may be adapted to massage the gums, the tongue, and elsewhere inside the mouth.

The scrubbing fingertip and the polishing fingertip may be made of synthetic fibers 260 and microscopic diamond particles 262. The dimensions of the synthetic fibers 260 and/or the microscopic diamond particles 262 may vary between the plurality of textured fingertips 206 in order to establish the characteristics of the plurality of textured fingertips 206. The size of the microscopic diamond particles 262 may determine abrasiveness of the plurality of textured fingertips 206. The abrasiveness made be analogous to the grit of sandpaper.

The synthetic fibers 260 and the method of coupling the microscopic diamond particles 262 to the synthetic fibers 260 may be durable, non-toxic, and biocompatible.

In a preferred embodiment, the scrubbing fingertip may comprise a fine scrubber 242 on the fourth sheath 240 and a rough scrubber 252 or the fifth sheath 250, the polishing fingertip may comprise a fine polishing tip 212 on the first sheath 210 and a rough polishing tip 222 on the second sheath 220, and the massaging brush 232 may be located on the third sheath 230.

The abrasiveness of the fine polishing tip 212 may be approximately 6000 grit. The fine polishing tip 212 may be adapted to polish and clean the tongue, inferior labial frenulum, gingivae (gums), sublingual papilla, frenulum linguae, molars, superior lip, inferior lip, hard palate, and soft palate.

The abrasiveness of the rough polishing tip 222 may be approximately 3000 grit. The rough polishing tip 222 may be adapted to polish and clean the tongue, inferior labial frenulum, gingivae (gums), sublingual papilla, frenulum linguae, molars, superior lip, inferior lip, hard palate, and soft palate.

The abrasiveness of the fine scrubber 242 may be approximately 1500 grit. The fine scrubber 242 may be adapted to scrub and clean the soft palate, uvula, tonsil, and gloss palatine arch.

The abrasiveness of the rough scrubber 252 may be approximately 800 grit. The rough scrubber 252 may be adapted to scrub the inside of the mouth.

The massaging brush 232 may comprise a plurality of bristles 264 that may project in parallel away from the third sheath 230. The massaging brush 232 may be adapted to brush and massage the tongue, the teeth, the gums, hard palate, and elsewhere inside the mouth.

In some embodiments, an individual textured fingertip selected from the plurality of textured fingertips 206 may extend for a distance of one-half inch with an error of one-eighth inch (½+/−⅛ in.) from the tip of the plurality of finger sheaths 204 towards the main body 202.

The glove 200 may be available in multiple sizes. In a preferred embodiment, the glove 200 may be available in five (5) sizes—extra small (XS), small (S), medium (M), large (L), and extra large (XL). Glove sizes are generally determined by taking two (2) measurements of the dominant hand. The first measurement is obtained by wrapping a measuring tape around the widest part of the dominant hand (excluding the thumb) just below the knuckles. The second measurement is obtained by measuring from the tip of the middle finger to the base of the hand. Choose the larger of the first measurement and the second measurement.

As non-limiting examples,
If the larger measurement is six inches (6 in.) or less, the glove size is 6, XS.
If the larger measurement is seven inches (7 in.) or less, the glove size is 7, S.
If the larger measurement is eight inches (8 in.) or less, the glove size is 8, M.
If the larger measurement is nine inches (9 in.) or less, the glove size is 9, L.
If the larger measurement is ten inches (10 in.) or less, the glove size is 10, XL.

In embodiments designed for children, the glove 200 may be available in smaller sizes suitable for toddlers and up. These child-friendly versions may incorporate entertaining and educational design elements on each finger, such as happy faces, cartoon characters, body parts, or animal motifs like mouths, sharks, fish, or whales. These designs serve to make the oral care routine more engaging for children, potentially improving compliance and helping to develop good dental hygiene habits from an early age.

The invention 100 may also be adapted for use on animals, with modifications to suit various species' oral structures. For animal use, the size of the brush and scrubbing elements may be increased to clean animal teeth thoroughly and properly. This adaptation expands the potential market for the invention, making it suitable for use by pet owners, veterinarians, and animal care professionals.

In some embodiments, the invention 100 may be made from natural rubber, silicone, latex, nitrile rubber, neoprene, nylon, or any combination thereof.

For versions designed for animal use, more durable materials may be employed to withstand the increased wear and potential biting that may occur during use on animals. The exact specifications of animal-oriented versions may vary based on the target species and intended use case (e.g., domestic pets vs. veterinary applications).

2. OPERATION OF THE PREFERRED EMBODIMENT

Figure 1:
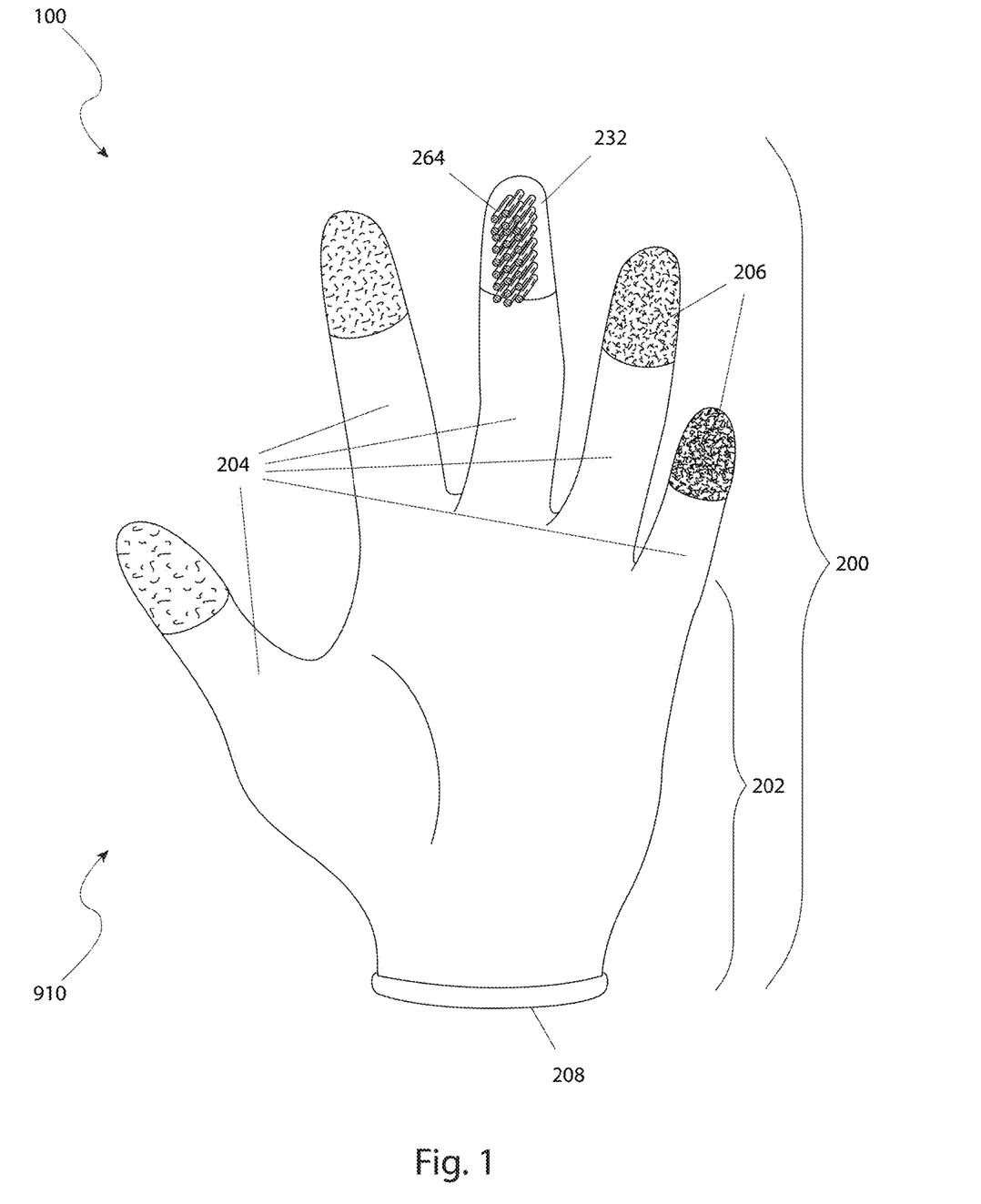
FIG. 1 is a front view of a dental hygiene glove 100, according to an embodiment of the present invention, illustrating use on a left hand 910.
Figure 2:
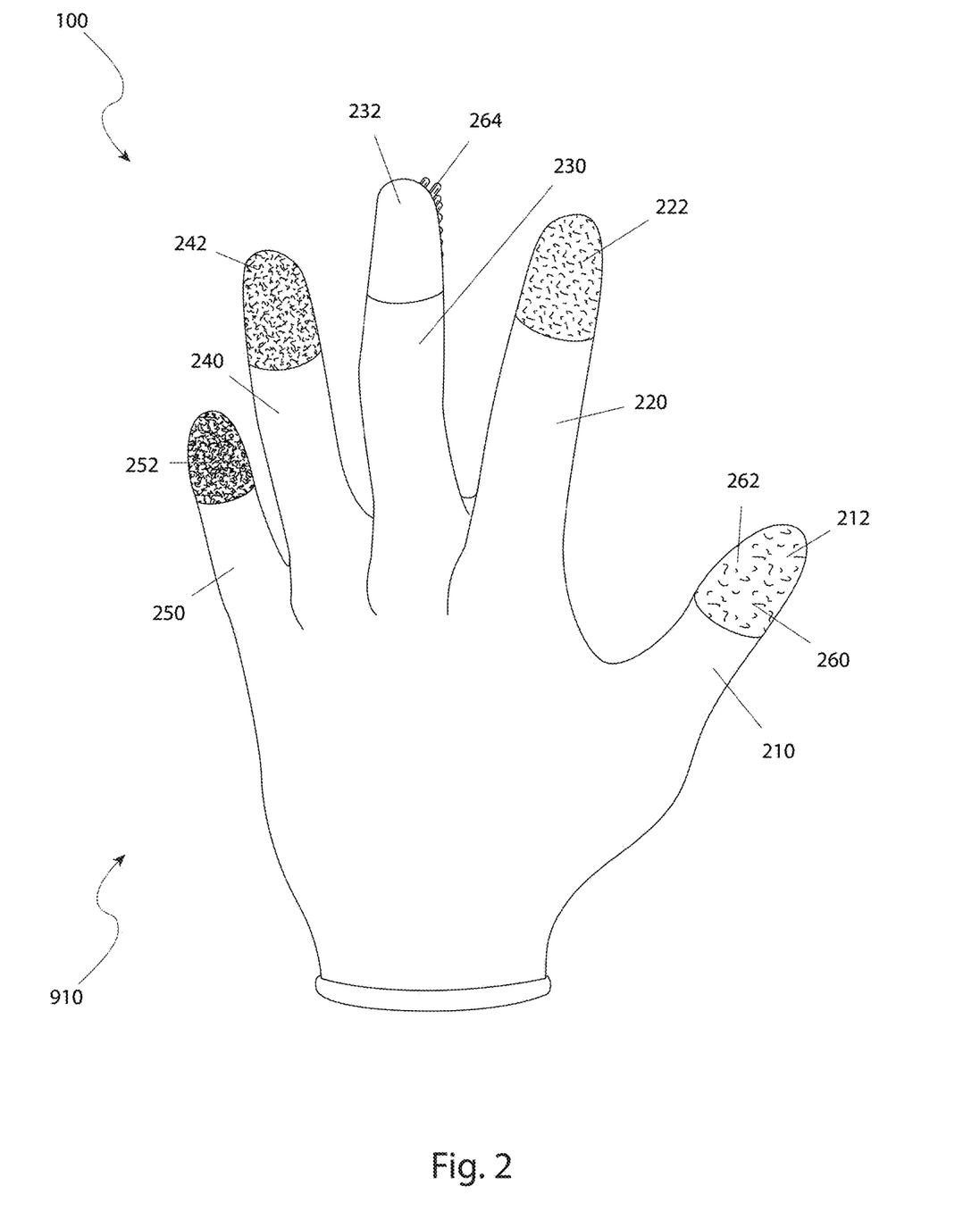
FIG. 2 is a rear view of a dental hygiene glove 100, according to an embodiment of the present invention, illustrating use on a left hand 910.
Figure 3:
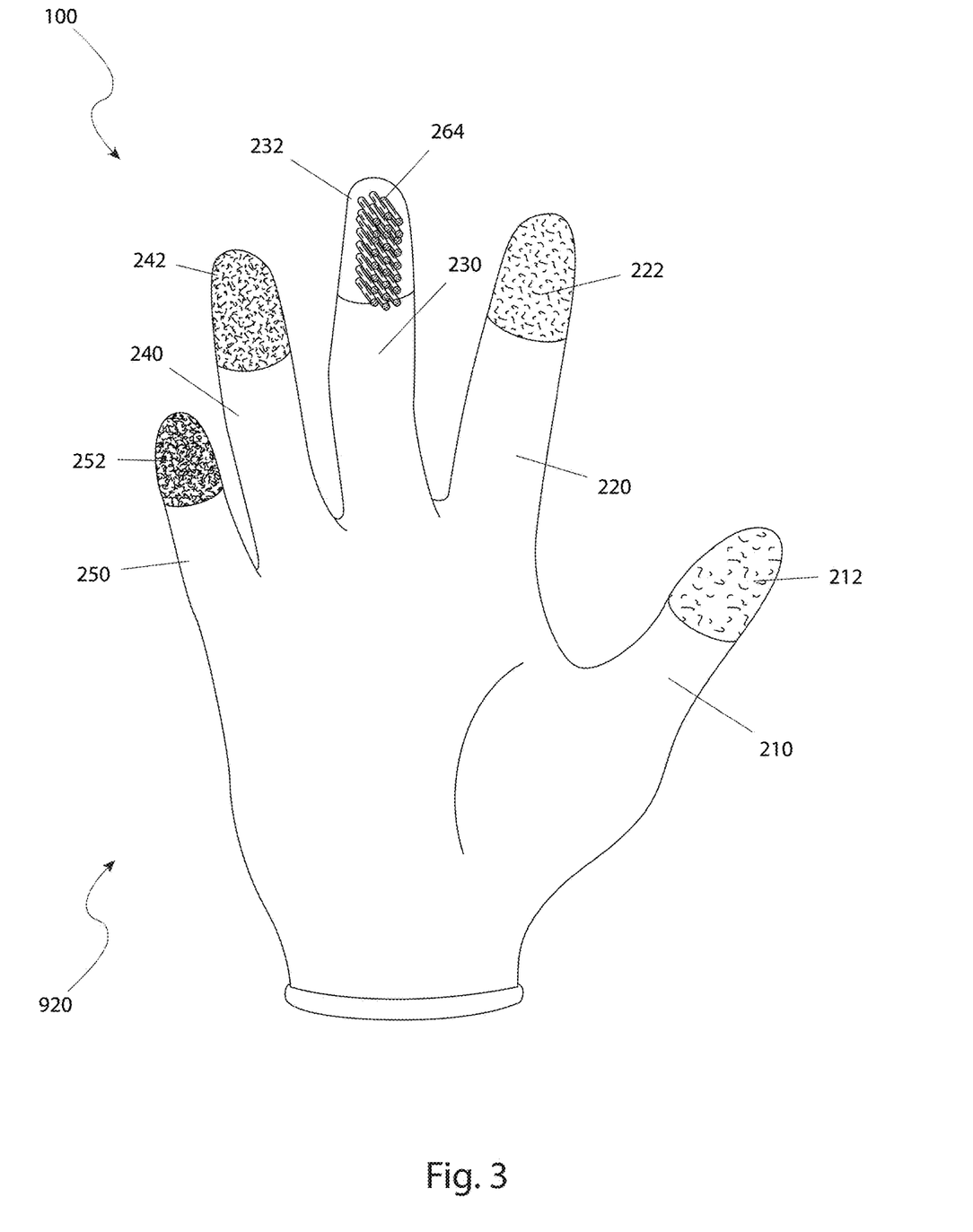
FIG. 3 is a front view of a dental hygiene glove 100, according to an embodiment of the present invention, illustrating use on a right hand 920.
Figure 4:
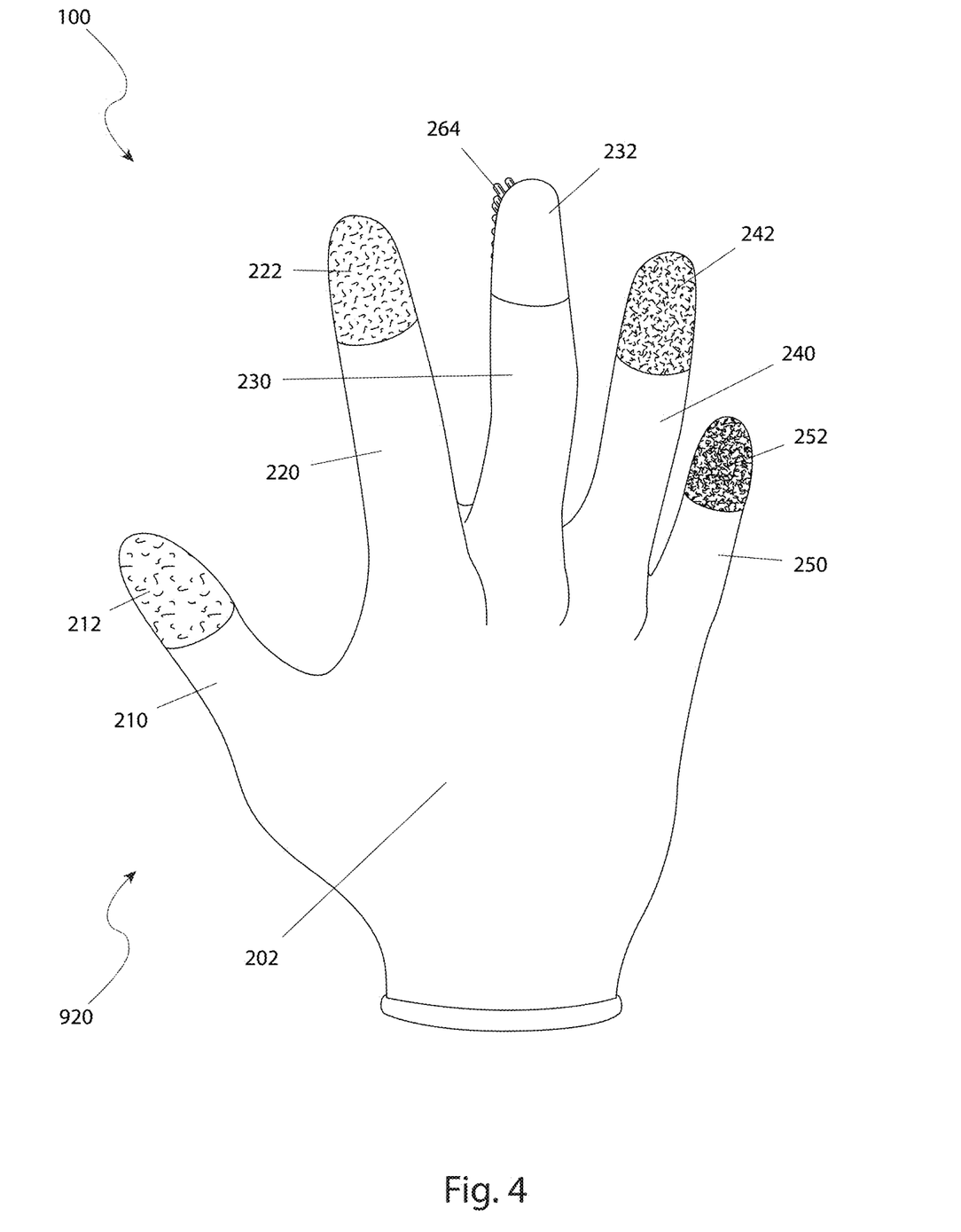
FIG. 4 is a rear view of a dental hygiene glove 100, according to an embodiment of the present invention, illustrating use on a right hand 920; and, FIG. 5 is an in-use view of a dental hygiene glove 100, according to an embodiment of the present invention.
Figure 5:
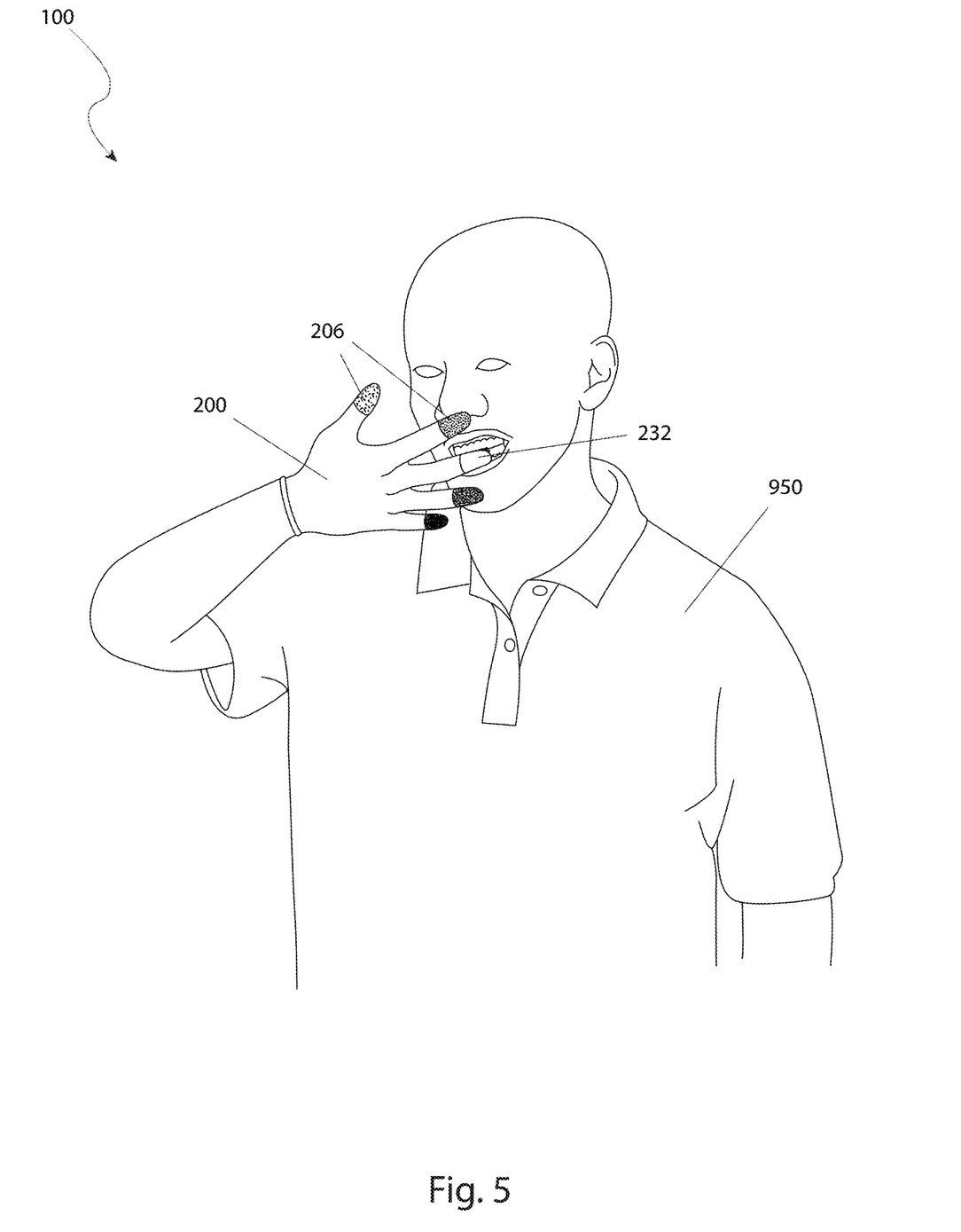

In use, a user 950 may don the glove 200 by sliding the glove 200 over a left hand 910 or a right hand 920 such that the plurality of bristles 264 of the massaging brush 232 are facing the palmar side of the hand. The user 950 may clean the teeth, the tongue, and elsewhere inside the mouth by scrubbing with the at least one scrubbing fingertip and polishing with a polishing fingertip. The user 950 may transition from coarsest to least coarse by first using the rough scrubber 252 then the fine scrubber 242, then the rough polishing tip 222, and finally the fine polishing tip 212. The user 950 may massage the gums, the tongue, and elsewhere within the mouth using the massaging brush 232. After use, the glove 200 may be removed and washed with warm water.

For use with children, parents or caregivers may assist in properly donning and using the glove 200. The entertaining designs on each finger can be used as a teaching tool, helping children learn about different parts of the mouth and proper cleaning techniques. Parents may guide children through the cleaning process, using the various textured fingertips in the appropriate order.

When used on animals, the user (pet owner or veterinary professional) would don the glove 200 and use it to clean the animal's teeth and gums. The increased size of the brush and scrubbing elements in animal-oriented versions allows for more efficient cleaning of larger tooth surfaces. Care should be taken to approach animals calmly and to be gentle when cleaning to avoid causing distress.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples, and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this Patent Application.

The invention claimed is:

1. A multipurpose dental glove comprising:
a glove body adapted to be worn on a hand and made from biocompatible materials selected from natural rubber, silicone, latex, nitrile rubber, neoprene, nylon, or combinations thereof;
a plurality of finger sheaths extending from the glove body; and
a plurality of textured fingertips comprises synthetic fibers coated with microscopic diamond particles having abrasiveness levels between 800-6000 grit, and wherein each textured fingertip is configured to perform a specific oral care function for safe intraoral use; and wherein the textured fingertips include at least one polishing fingertip having approximately 6000 grit abrasiveness, at least one scrubbing fingertip having approximately 800 grit abrasiveness, and at least one massaging brush comprising nylon bristles.

2. The multipurpose dental glove of claim 1, wherein the plurality of textured fingertips comprises:
at least one polishing fingertip comprising synthetic fibers coated with microscopic diamond particles having approximately 6000 grit abrasiveness;
at least one scrubbing fingertip at least one scrubbing fingertip comprising synthetic fibers coated with microscopic diamond particles having approximately 800 grit abrasiveness; and
at least one massaging brush comprising a plurality of nylon bristles specifically configured for gentle gum stimulation during intraoral use.

3. The multipurpose dental glove of claim 2, wherein:
the polishing fingertip comprises synthetic fibers coated with microscopic diamond particles;
the scrubbing fingertip comprises synthetic fibers coated with microscopic diamond particles; and
the massaging brush comprises a plurality of nylon bristles.

4. The multipurpose dental glove of claim 1, wherein the plurality of textured fingertips comprises:
a fine polishing tip on a first finger sheath having approximately 6000 grit abrasiveness; a rough polishing tip on a second finger sheath having approximately 3000 grit abrasiveness;
a rough polishing tip on a second finger having approximately 3000 grit abrasiveness;
a massaging brush on a third finger sheath comprising nylon bristles;
a fine scrubber on a fourth finger sheath having approximately 1500 grit abrasiveness; and
a rough scrubber on a fifth finger sheath having approximately 800 grit abrasiveness; wherein each fingertip is specifically designed for safe and effective intraoral use.

5. The multipurpose dental glove of claim 4, wherein:
the fine polishing tip has an abrasiveness of approximately 6000 grit;
the rough polishing tip has an abrasiveness of approximately 3000 grit;
the fine scrubber has an abrasiveness of approximately 1500 grit; and
the rough scrubber has an abrasiveness of approximately 800 grit.

6. The multipurpose dental glove of claim 1, wherein the glove body and textured fingertips are specifically sized and configured for safe use on human teeth and gums, with biocompatible materials and abrasiveness levels appropriate for delicate oral tissues.

7. The multipurpose dental glove of claim 6, wherein the textured fingertips are specifically calibrated to provide effective cleaning without damaging oral tissues, and wherein the abrasiveness levels are selected to be safe for direct contact with teeth, gums, and other intraoral surfaces.

8. The multipurpose dental glove of claim 1, wherein the glove body is made from a material selected from the group consisting of natural rubber, silicone, latex, nitrile rubber, neoprene, nylon, and combinations thereof.

9. The multipurpose dental glove of claim 1, wherein each textured fingertip extends for a distance of approximately one-half inch with an error of one-eighth inch from the tip of the corresponding finger sheath towards the glove body.

10. The multipurpose dental glove of claim 1, wherein the glove body is available in multiple sizes to accommodate different hand sizes.

11. A method of using the multipurpose dental glove of claim 1, comprising:

donning the glove on a hand;

using the textured fingertips in a specific order from coarsest to least coarse; and removing and washing the glove after use.

12. The multipurpose dental glove of claim 1, further comprising a flexible, thin material between the finger sheaths specifically designed to allow for improved dexterity and precise reach within the confined space of the human mouth during dental hygiene procedures.

\* \* \* \* \*